(12) United States Patent
Chou et al.

(10) Patent No.: US 11,782,215 B2
(45) Date of Patent: Oct. 10, 2023

(54) OPTICAL DEVICE

(71) Applicant: BROWAVE CORPORATION, Hsinchu County (TW)

(72) Inventors: Jung-Tsung Chou, Taoyuan (TW); Chih-Yang Liao, Toufen (TW); Yuan-Hung Chuang, Taoyuan (TW); Hung-Kuang Hsu, Qionglin Township, Hsinchu County (TW)

(73) Assignee: BROWAVE CORPORATION, Hsinchu County (TW)

( * ) Notice: Subject to any disclaimer, the term of this patent is extended or adjusted under 35 U.S.C. 154(b) by 0 days.

(21) Appl. No.: 17/570,127

(22) Filed: Jan. 6, 2022

(65) Prior Publication Data
US 2023/0213701 A1 Jul. 6, 2023

(51) Int. Cl.
| | |
|---|---|
| *G02B 6/293* | (2006.01) |
| *G02B 6/26* | (2006.01) |
| *G02B 3/00* | (2006.01) |
| *G02B 27/00* | (2006.01) |
| *G02B 5/20* | (2006.01) |
| *G02B 6/34* | (2006.01) |
| *G02B 6/27* | (2006.01) |
| *G02B 6/32* | (2006.01) |
| *H04B 10/25* | (2013.01) |

(52) U.S. Cl.
CPC .......... *G02B 6/262* (2013.01); *G02B 3/0006* (2013.01); *G02B 5/201* (2013.01); *G02B 6/276* (2013.01); *G02B 6/2766* (2013.01); *G02B 6/2938* (2013.01); *G02B 6/325* (2013.01); *G02B 6/34* (2013.01); *G02B 27/0025* (2013.01); *H04B 10/25* (2013.01)

(58) Field of Classification Search
None
See application file for complete search history.

(56) References Cited

U.S. PATENT DOCUMENTS

| | | |
|---|---|---|
| 8,744,223 B2 | 6/2014 | Yamashita et al. |
| 9,989,706 B2 | 6/2018 | Yue |
| 10,379,301 B2 | 8/2019 | Luo et al. |
| (Continued) | | |

FOREIGN PATENT DOCUMENTS

| | | |
|---|---|---|
| CN | 205507150 U | 8/2016 |
| CN | 205507151 U | 8/2016 |
| (Continued) | | |

OTHER PUBLICATIONS

JPH 11-190809 (Year: 1999).*
(Continued)

*Primary Examiner* — Chad H Smith
(74) *Attorney, Agent, or Firm* — Muncy, Geissler, Olds & Lowe, P.C.

(57) ABSTRACT

An optical device is provided. The optical device includes a fiber array and an optical assembly. The fiber array includes a common channel and a plurality of divided channels arranged in parallel in a first direction and extending along a second direction, and the fiber array has a first surface from a top view perspective. The optical assembly is coupled to the first surface of the fiber array. The first surface and the common channel of the fiber array form an angle less than 90 degrees from the top view perspective.

16 Claims, 5 Drawing Sheets

(56) References Cited

U.S. PATENT DOCUMENTS

| | | | |
|---|---|---|---|
| 10,551,569 B2 | 2/2020 | Gui et al. | |
| 2002/0097957 A1* | 7/2002 | Kikuchi | G02B 6/327 |
| | | | 385/33 |
| 2006/0198576 A1* | 9/2006 | Furusawa | G02B 6/32 |
| | | | 385/47 |
| 2020/0119828 A1 | 4/2020 | Sahni | |

FOREIGN PATENT DOCUMENTS

| | | | |
|---|---|---|---|
| CN | 110531472 A | | 12/2019 |
| CN | 110927882 A | | 3/2020 |
| CN | 111458803 A | | 7/2020 |
| CN | 211955900 U | | 11/2020 |
| CN | 213240587 U | | 5/2021 |
| CN | 112994829 A | | 6/2021 |
| JP | H11-190809 | * | 7/1999 |

OTHER PUBLICATIONS

Office Action and Search Report of TW family patent application No. 111116492, dated Jun. 6, 2023.
Brief translation of the Office Action and Search Report of TW amily patent application No. 111116492.

* cited by examiner

OPTICAL DEVICE

FIELD

The present disclosure relates to an optical device, particularly, to a MUX/DEMUX device.

BACKGROUND

Minimizing optical loss is critical to improving performance of an optical device. Many factors are related to the optical loss, such as alignment, aberration, contamination, and others. Furthermore, a dimension of the optical device also affects the applications of the optical device. Therefore, improving performance and miniaturization are importance issues in this field.

BRIEF DESCRIPTION OF THE DRAWINGS

Aspects of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
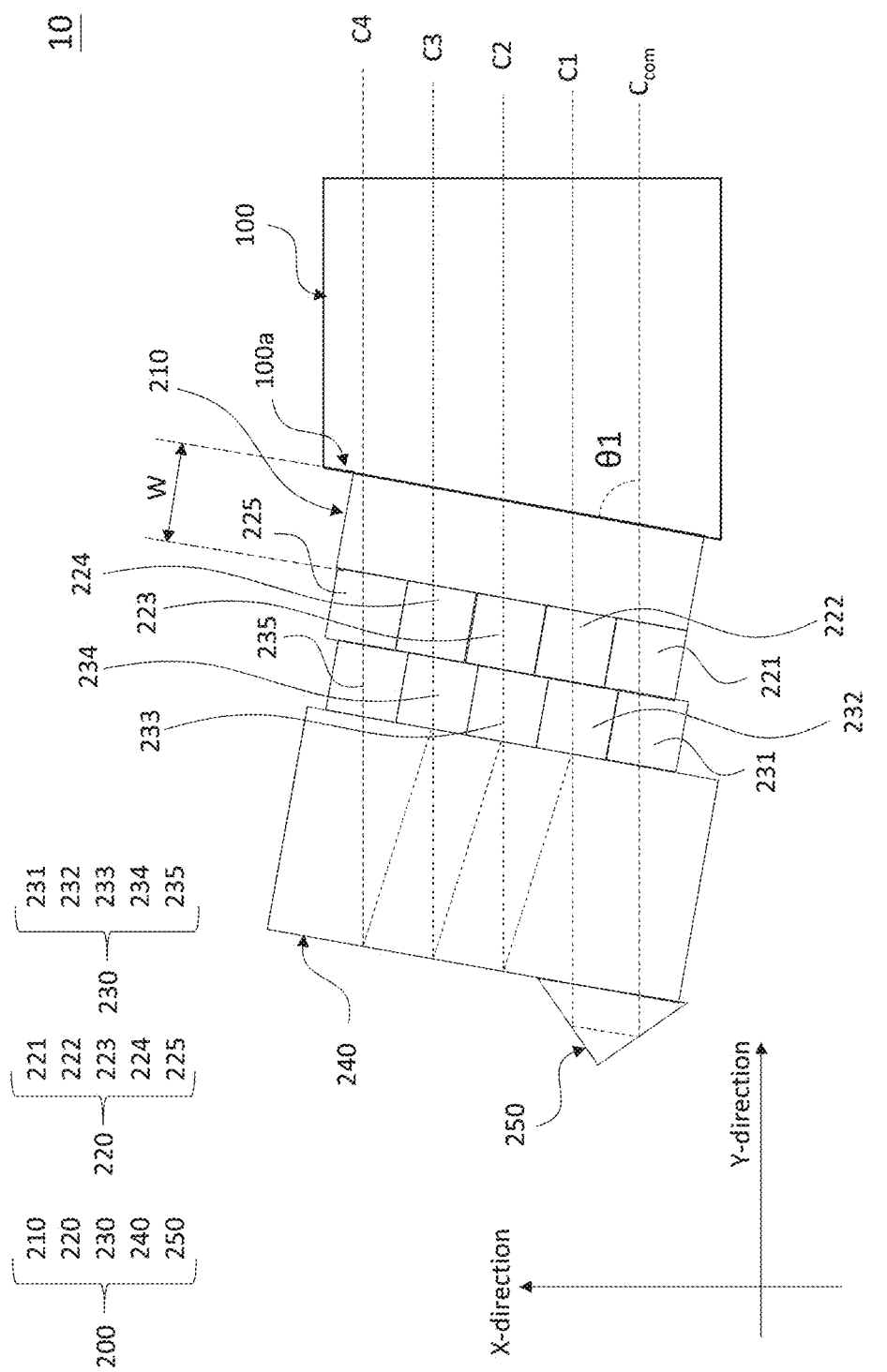
FIG. 1 illustrates an optical device according to some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "on" and the like, may be used herein for ease of description to describe one element or feature's relationship to another elements) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Present disclosure provides a low loss and compact MUX/DEMUX device, wherein terminals of common channel and divided channels use the same sets of lens and fiber array on the same side. In addition, each fiber and a side surface of the fiber array form an angle less than 90 degrees, so that insertion loss can be improved by eliminating aberration. Compared to conventional approaches, the present disclosure features a low loss, compact, and cost-effective design in the field of MUX/DEMUX applications.

FIG. 1 illustrates an optical device 10 according to some embodiments of the present disclosure. The optical device 10 is illustrated from a top view perspective. In some embodiments, the optical device 10 is configured to demultiplex (DEMUX) an optical signal into a plurality of divided optical signals. In some embodiments, the optical device 10 is further configured to multiplex (MUX) a plurality of divided optical signals into an optical signal. In other words, the optical device 10 can be a MUX/DEMUX device.

In some conventional approaches, common channel and divided channels are separated in different sides, and use different sets of lens and fiber array assembly. This kind of structure has a higher cost because of more elements needed and more time to assemble. In addition, the conventional MUX/DEMUX device is disposed on a substrate and a beam is propagated in free space between each elements. An arrangement of elements of the MUX/DEMUX device (such as distance between elements) should be carefully designed to reach a smaller size. However, the substrates in the MUX/DEMUX device according to conventional approaches cause miniaturization to be difficult. Compared to the above approaches, the present application provides the optical device 10 which is a substrate-free device with a more simplified configuration. Therefore, the optical device 10 is more easily miniaturized and more cost-effective than the optical devices according to conventional approaches.

As shown in FIG. 1, the optical device 10 includes a fiber array 100 and an optical assembly 200 attached to the fiber array 100. Because the fiber array 100 is directly in contact with the optical assembly 200, there is no free space between the fiber array 100 and the optical assembly 200. Therefore, the optical device 10 can avoid contaminating exposed side surfaces of each element therein. In some embodiments, the optical device 10 is also referred to as a compact multi-channel MUX/DEMUX device.

The fiber array 100 includes a common channel $C_{com}$ and a plurality of divided channels C1 to C4 arranged in parallel in an X-direction, and the common channel $C_{com}$ and the divided channels C1 to C4 extend along a Y-direction. It should be noted that a number of divided channels C1 to C4 shown in FIG. 1 is provided for illustrative purposes, and the present disclosure is not limited thereto. Various numbers of the divided channels are within the contemplated scope of the present disclosure.

The fiber array 100 has a surface 100a (or a side surface referred herein) attached to the optical assembly 200. The surface 100a and the common channel $C_{com}$ form an angle θ1 less than 90 degrees from a top view perspective, so that return loss of the optical signal can be decreased and insertion loss can be improved by eliminating aberration. The X-direction is orthogonal to the Y-direction, and the surface 100a is perpendicular to a plane mutually defined by the X-direction and the Y-direction. In some embodiments, like all other side surfaces of spacer layer 210, the fiber array 100, the lens array 220, etc., the side surface 100a is perpendicular with respect to a common bottom of the optical device 10, instead of forming an oblique angle therebetween.

Because the optical device 10 can perform MUX and DEMUX operations, an optical signal transmitted through the common channel $C_{com}$ is hereinafter referred to as a MUX signal, and optical signals transmitted through the divided channels C1 to C4 are hereinafter referred to as DEMUX signals, to facilitate understanding.

When functioning as the DEMUX device, the fiber array 100 is configured to receive the MUX signal through a terminal of the common channel $C_{com}$, and configured to output the DEMUX signals from terminals of the divided channels C1 to C4. When functioning as the MUX device, the fiber array 100 is configured to receive the DEMUX signals through the terminals of the divided channels C1 to C4, and configured to output the MUX signal from the terminal of the common channel $C_{com}$.

The optical assembly 200 includes a space layer 210, a lens array 220, a filter layer 230, a Z-block 240, and a prism 250. The space layer 210 has a side attached to the surface 100a of the fiber array 100; the lens array 220 has a side attached to the spacer layer 210 opposite to the fiber array 100; the filter layer 230 has a side attached to the lens array 220 opposite to the spacer layer 210; the Z-block 240 has a side attached to the filter layer 230 opposite to the lens array 220; and the prism 250 is attached to the Z-block 240 opposite to the filter layer 230. As illustrated in FIG. 1, the fiber array 100, the space layer 210, the lens array 220, the filter layer 230, the Z-block 240, and the prism 250 are attached together. Alternatively stated, the optical path (illustrated as dashed lines in FIG. 1) of the MUX and/or DEMUX signals in the optical device 10 does not pass through free space.

The spacer 210 includes materials transparent to the MUX and/or DEMUX signals, for example, glass. In some embodiments, a width W of the spacer layer 210 is designed according to a focal length of the lens array 220 to balance the length of optical paths of all channels. In some embodiments, the width W of the spacer layer 210 can be uniform along the primary dimension thereof, as shown in FIG. 1. In some other embodiments, the width W of the spacer layer 210 can be tapered along the primary dimension thereof according to the desired length of optical path for each channel, as subsequently shown in FIG. 4.

The lens array 220 includes a plurality of lenses 221 to 225 corresponding to the common channel $C_{com}$ and the divided channels C1 to C4. The filter layer 230 includes filters 231 to 235 corresponding to the lenses 221 to 225, respectively. More specifically, the filter 231 is aligned with the lens 221 and the common channel $C_{com}$, and the filters 232 to 235 are aligned with the lenses 222 to 225 and the divided channels C1 to C4, respectively. When functioning as the MUX device, the lenses 222 to 225 are configured to optically align the DEMUX signals with the filters 232 to 235, respectively. When functioning as the DEMUX device, the lens 221 is configured to optically align the MUX signal with the filter 231. Alternatively stated, the lens 221 is configured to collimate the MUX signal to the filter 231, and the lenses 222 to 225 are configured to collimate the DEMUX signals to the lenses 232 to 235, respectively.

The filters 231 to 235 are categorized into two types. The filters 232 to 235 are of a first type, and have pass bands corresponding to the divided channels C1 to C4. The pass bands of the filters 232 to 235 are different from each other. The filter 231 is of a second type, and has a pass band covering all of the pass bands of the filters 232 to 235, or is just a transparent spacer. In some embodiments, the filter 231 includes a polarizer. In other embodiments, the filter 231 includes a Faraday rotator.

In some embodiments, the filter layer 230 is called a wavelength division multiplexing (WDM) thin film or a dense wavelength division multiplexing (DWDM) thin film, depending on the application scenarios.

When functioning as the MUX device, the Z-block 240 is configured to receive the DEMUX signals from the filters 232 to 235, and merge (multiplex) the DEMUX signals into the MUX signal. When functioning as the DEMUX device, the Z-block 240 is configured to receive the MUX signal through the filter 231, and divide (demultiplex) the MUX signal into the DEMUX signals.

The prism 250 is optically aligned with the common channel $C_{com}$ and the first divided channel (C1). In some embodiments, the prism 250 is a right angle prism, and is configured to guide the MUX signal from the filter 231 to the filter 232, or to guide the DEMUX signals from the filter 232 to the filter 231.

Figure 2B:
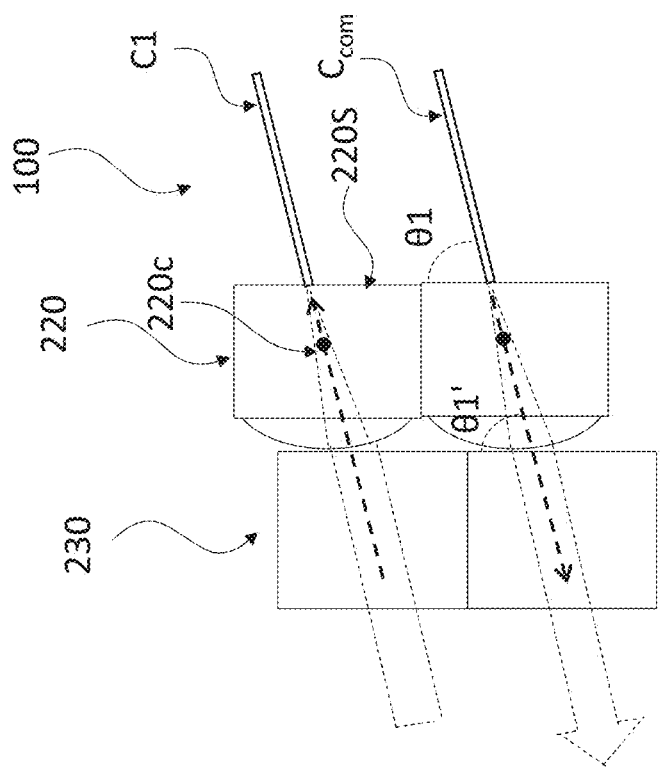
FIG. 2b illustrate a portion of the filter layer, the lens array, and the fiber array according to some embodiments of the present disclosure.
Figure 2A:
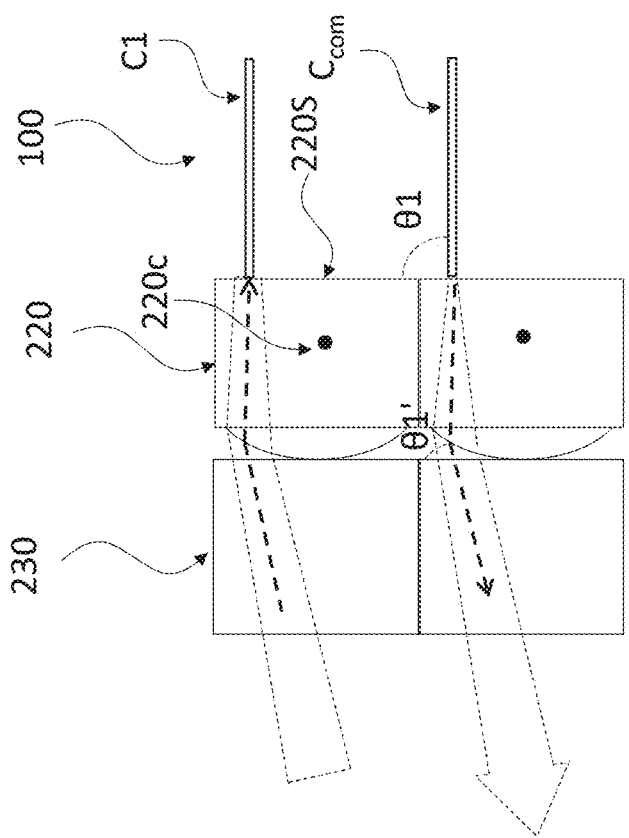
FIG. 2a illustrates a portion of a filter layer, a lens array, and a fiber array according to some embodiments of the present disclosure.

Please refer to FIG. 2a and FIG. 2b. FIG. 2a illustrates a portion of the filter layer 230, the lens array 220, and the fiber array 100 according to some embodiments of the present disclosure. FIG. 2b illustrates a portion of the filter layer 230, the lens array 220, and the fiber array 100 according to some embodiments of the present disclosure. In some embodiments, the angle θ1 between one of the common channel $C_{com}$ or the divided channels C1 to C4 and the surface 220S of the lens array 220 is substantially equal to 90 degrees. To achieve a specific propagating angle in the Z-block 240, fiber of each channel should shift a distance relative to an optical axis that passes through a center of curvature of each lens. Such an off-axis configuration causes the beams (i.e., the MUX signal and/or the DEMUX signals) from the common channel $C_{com}$ and/or the divided channels C1 to C4, to pass through peripheral areas of lenses 221 to 225 with a larger refraction angle, so as to induce additional spherical and coma aberration. To facilitate understanding, the embodiments in FIGS. 2a and 2b are described as the DEMUX device, and some elements (such as the spacer layer 210 and the Z-block 240) are omitted in FIGS. 2a and 2b.

Comparing the angles θ1 in FIGS. 2a and 2b, in order to keep a fixed angle θ1' of beams exiting the lens array 220 and entering the filter layer 230 (and hence the Z-block 240), different configuration of angles θ1 could cause each fiber to be aligned at different positions with respect to the center of curvature 220c of each lens, and then result in different extent of optical aberrations. For example, in FIG. 2a, the angle θ1 is equal to 90 degree and fibers corresponding to the channels ($C_{com}$, C1) should shift a distance relative to respective optical axis passes through a center of curvature 220c of each lens to keep the fixed angle set forth. Therefore, beams of the common channel $C_{com}$ and the divided channel C1 are both refracted with a greater angle by passing a peripheral portion of the respective lens in the lens array 220, so as to induce additional spherical and coma aberration. In addition, when looking at the inputting common channel $C_{com}$, a greater optical aberration causes the collimated beam width to become wider when propagating forward; likewise, when looking at the outputting divided channel C1, the collimated beam can be focused when passing through the respective lens of the lens array 220, yet the focused beam width is not 100% reversible. In this connection, when the focused beam width is wider than a mode field diameter of an optical fiber of any one of the divided channels C1 to C4, the coupling efficiency of the divided channels C1 to C4 decreases and thus increasing the insertion loss.

In order to decrease the optical aberration and to decrease the insertion loss, the angle θ1 in FIG. 2b is designed to be substantially the same as the fixed angle θ1' of the beam exiting from the lens so that a beam can pass through the center of curvature 220c of each lens of the lens array 220. Therefore, beams of the common channel $C_{com}$ and the divided channel C1 are both refracted with a smaller or a minimum angle by passing near a center portion of the respective lens in the lens array 220, so as to minimize spherical and coma aberration. In some embodiments, the angle θ1 is in a range of about 75 degrees to 85 degrees. In some embodiments of the present disclosure, the insertion loss is at least 0.5 dB lower than that of the conventional approaches.

Figure 3:
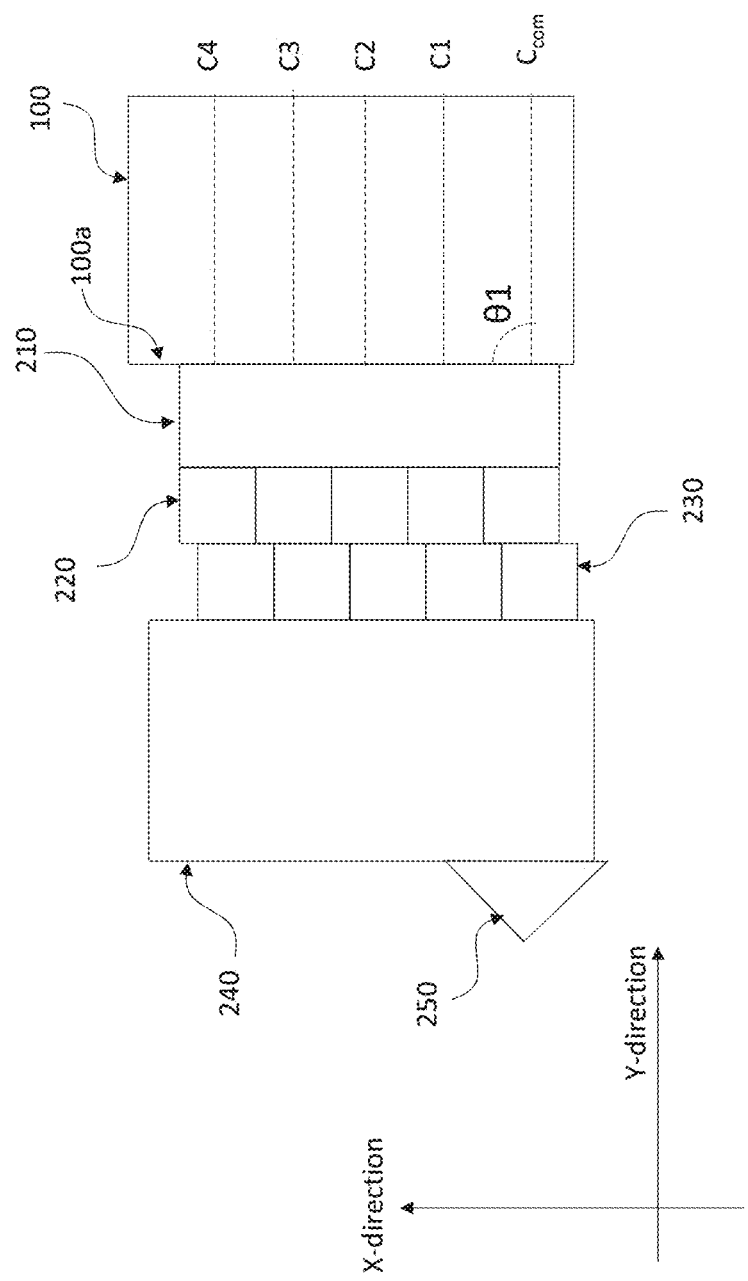
FIG. 3 illustrates an optical device according to other embodiments of the present disclosure.

In other embodiments, the angle θ1 is substantially equal to 90 degrees as illustrated in FIG. 3. In this embodiment, the optical assembly 200 includes a space layer 210, a lens array 220, a filter layer 230, a Z-block 240, and a prism 250. The space layer 210 has a side attached to the surface 100a of the fiber array 100; the lens array 220 has a side attached to the spacer layer 210 opposite to the fiber array 100; the filter layer 230 has a side attached to the lens array 220 opposite to the spacer layer 210; the Z-block 240 has a side attached to the filter layer 230 opposite to the lens array 220; and the prism 250 is attached to the Z-block 240 opposite to the filter layer 230. As illustrated in FIG. 3, the fiber array 100, the space layer 210, the lens array 220, the filter layer 230, the Z-block 240, and the prism 250 are attached together. Alternatively stated, the optical path of the MUX and/or DEMUX signals in the optical device 10 does not pass through free space. In addition, the optical device 10 can avoid contaminating exposed side surfaces of each element therein, and facilitating the miniaturization of the optical device, as well as to allow the optical device to be free of a common substrate.

Figure 4:
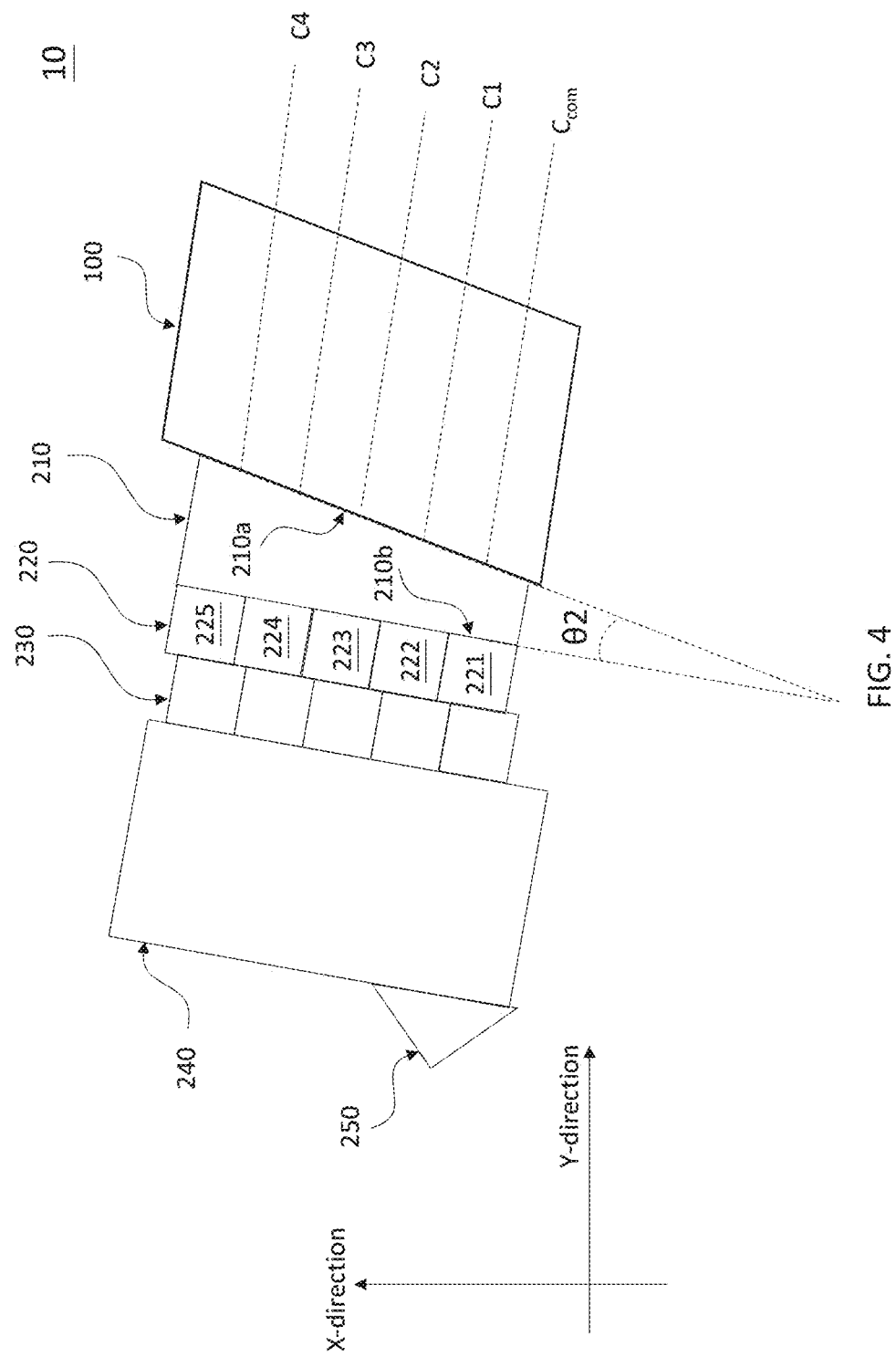
FIG. 4 illustrates an optical device according to various embodiments of the present disclosure.

Referring to FIG. 4, in various embodiments, the side 210a of the spacer layer 210 attached to the fiber array 100 is not parallel to the side 210b of the spacer layer 210 attached to the lens array 220. The side 210a and the side 210b form an angle θ2 greater than 0 degrees. In some embodiments, the angle θ2 is determined to optimize a working distance for a pair of input and output collimators, that is, (1) common channel $C_{com}$ and respective lens 221 assembly; and (2) divided channel C1 to C4 and respective lens 222 to 225 assembly, so as to minimize the optical misalignment relative to each focusing point and to decrease the insertion loss of the MUX signal and/or DEMUX signals.

Figure 5:
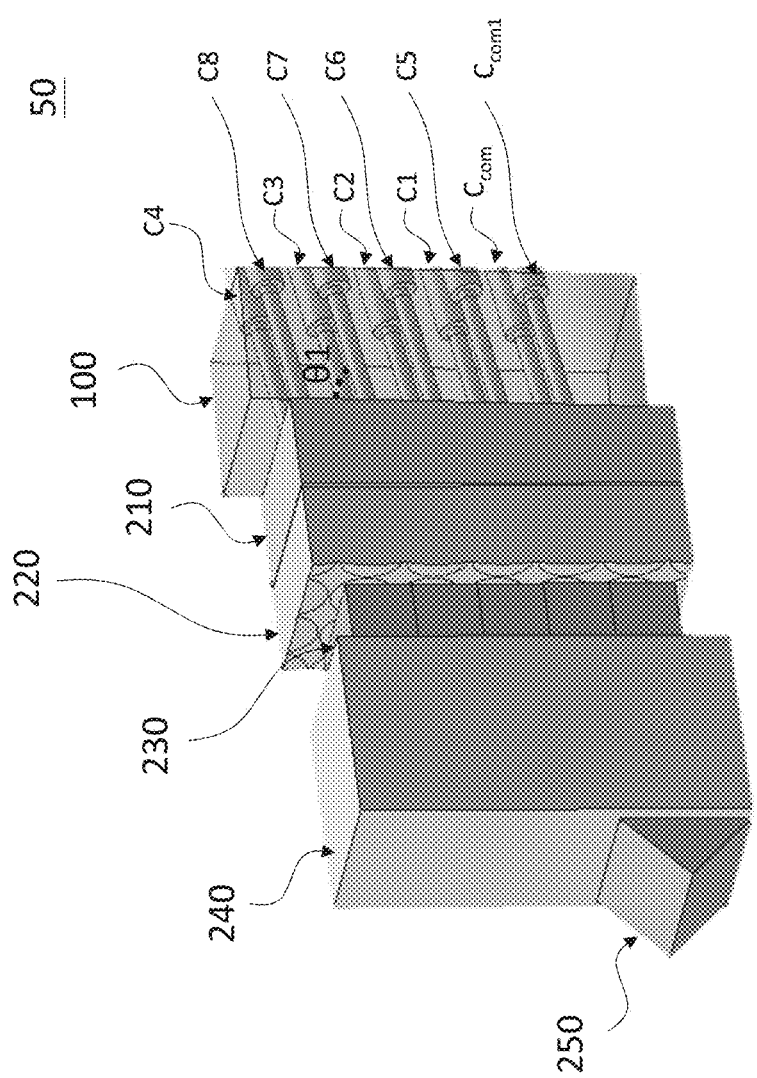
FIG. 5 illustrates an optical device according to alternative embodiments of the present disclosure.

Reference is made to FIG. 5. FIG. 5 illustrates an optical device 50 according to alternative embodiments of the present disclosure. Similar to the optical device 10, the optical device 50 includes the fiber array 100, the spacer layer 210, the lens array 220, the filter layer 230, the Z-block 240, and the prism 250. Compared to the optical device 10, the fiber array 100 of the optical device 50 is a 2-dimensional fiber array 100. The 2-dimensional fiber array 100 includes the common channels $C_{com}$ and the divided channels C1 to C4, and further includes a common channel $C_{com1}$ and divided channels C5 to C8.

The common channel $C_{com1}$ is similar to the common channel $C_{com}$, and the divided channels C5 to C8 are similar to the divided channels C1 to C4, respectively. Therefore, the details of the common channel $C_{com1}$ and the divided channels C5 to C8 are not repeated herein.

The optical device 50 also provides a substrate-free configuration, as well as decreases the insertion loss by implementing an angle θ1 between any one of the optical fibers (or the common channels $C_{com}$, $C_{com1}$ and divided channels C1 to C8) and the side surface of the spacer layer 210 facing the fiber array 100 to be less than 90 degrees.

In one exemplary aspect, an optical device is provided. The optical device includes a fiber array and an optical assembly. The fiber array includes a common channel and a plurality of divided channels arranged in parallel in a first direction and extending along a second direction, and the fiber array has a first surface from a top view perspective. The optical assembly is coupled to the first surface of the fiber array. The first surface and the common channel of the fiber array form an angle less than 90 degrees from the top view perspective.

In another exemplary aspect, an optical device is provided. The optical device includes a fiber array and an optical assembly. The fiber array includes a common channel and a plurality of divided channels arranged in parallel, and the fiber array has a first surface from a top view perspective. The optical assembly is coupled to the first surface of the fiber array, and the optical assembly includes a lens array and a filter layer disposed on a same side of the fiber array. The lens array is attached to the filter layer.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
 a fiber array, comprising a common channel and a plurality of divided channels arranged in parallel in a first direction and extending along a second direction, the fiber array having a first surface from a top view perspective; and
 an optical assembly, coupled to the first surface of the fiber array, comprising:
  a spacer layer, having a first side attached to the first surface of the fiber array;
  a lens array, attached to a second side of the spacer layer opposite to the first side; and
  a filter layer, attached to the lens array, wherein the filter layer comprises:
   a plurality of filters of a first type, comprising a plurality of pass bands corresponding to the plurality of divided channels, wherein the plurality of pass bands are different from each other; and a filter of a second type, configured to align with the common channel of the fiber array, wherein the filter of the second type comprises a pass band covering all of the pass bands of the plurality of filters of the first type, wherein the first surface and the common channel of the fiber array form an angle less than 90 degrees from the top view perspective.

2. The optical device of claim 1, wherein the first direction is orthogonal to the second direction, and the first surface is perpendicular to a plane mutually defined by the first direction and the second direction.

3. The optical device of claim 1, wherein the angle between the first surface and the common channel of the fiber array is configured to reduce optical aberrations by allowing a beam passing through the common channel or the divided channels to travel near a center of curvature of a respective lens of the lens array.

4. The optical device of claim 1, wherein the angle between the first surface and the common channel of the fiber array is configured to allow a beam passing through the common channel or the divided channels to travel through a center of curvature of a respective lens of the lens array.

5. The optical device of claim 1, wherein the filter of the second type comprises a polarizer or a Faraday rotator.

6. The optical device of claim 1, wherein the fiber array comprises a 2-dimensional fiber array.

7. The optical device of claim 1, wherein the angle between the first surface and the common channel of the fiber array is in a range from about 75 degrees to 85 degrees.

8. The optical device of claim 1, wherein the optical assembly is configured to receive a multiplexed (MUX) signal through the common channel of the fiber array and demultiplex the MUX signal to output a plurality of demultiplexed (DEMUX) signals to the divided channels of the fiber array, or to receive the plurality of DEMUX signal from the divided channels of the fiber array, and multiplex the plurality of DEMUX signals to output the MUX signal to the common channel of the fiber array.

9. An optical device, comprising:
a fiber array, comprising a common channel and a plurality of divided channels arranged in parallel, the fiber array having a first surface from a top view perspective; and
an optical assembly, coupled to the first surface of the fiber array, the optical assembly comprising:
a lens array and a filter layer disposed on a same side of the fiber array, wherein the lens array is attached to the filter layer;
a spacer layer, attached to the first surface of the fiber array;
a Z-block, attached to a side of the filter layer away from the lens array; and
a prism attached to the Z-block on a side opposite to the filter layer and optically aligned with the common channel and a first divided channel of the plurality of divided channels of the fiber array.

10. The optical device of claim 9, wherein the common channel and the plurality of divided channels are arranged in a first direction and extend along a second direction orthogonal to the first direction, wherein the first surface and the common channel of the fiber array form an angle less than 90 degrees from the top view perspective.

11. The optical device of claim 10, wherein the first surface is perpendicular to a plane mutually defined by the first direction and the second direction.

12. The optical device of claim 9, wherein the filter layer comprises:
a plurality of filters of a first type, comprising a plurality of pass bands corresponding to the plurality of divided channels, wherein the plurality of pass bands are different from each other; and
a filter of a second type, configured to align with the common channel of the fiber array.

13. The optical device of claim 12, wherein the filter of the second type comprises an isolator.

14. The optical device of claim 9, wherein the fiber array comprises a 2-dimensional fiber array.

15. The optical device of claim 9, wherein an angle between the first surface and the common channel of the fiber array is in a range from about 75 degrees to 85 degrees.

16. The optical device of claim 9, wherein the optical assembly is configured to receive a multiplexed (MUX) signal through the common channel of the fiber array and demultiplex the MUX signal to output a plurality of demultiplexed (DEMUX) signals to the divided channels of the fiber array, or to receive the plurality of DEMUX signals from the divided channels of the fiber array, and multiplex the plurality of DEMUX signals to output the MUX signal to the common channel of the fiber array.

* * * * *